(12) United States Patent
Stall et al.

(10) Patent No.: US 7,507,150 B2
(45) Date of Patent: Mar. 24, 2009

(54) SHIRRED CASING

(75) Inventors: Alan David Stall, Naperville, IL (US); Dennis Bruce Simmerly, Naperville, IL (US); Keith Arthur Watts, Wheaton, IL (US)

(73) Assignee: Visko Teepak Belgium NV, Lommel (BE)

( * ) Notice: Subject to any disclaimer, the term of this patent is extended or adjusted under 35 U.S.C. 154(b) by 80 days.

(21) Appl. No.: 10/924,086

(22) Filed: Aug. 23, 2004

(65) Prior Publication Data

US 2006/0040602 A1  Feb. 23, 2006

(51) Int. Cl.
*A22C 13/02* (2006.01)
(52) U.S. Cl. .................... 452/32; 452/35; 426/513
(58) Field of Classification Search ............ 452/21–39; 426/513
See application file for complete search history.

(56) References Cited

U.S. PATENT DOCUMENTS

| | | | |
|---|---|---|---|
| 1,302,194 A | 4/1919 | Mayer | |
| 1,616,971 A | 2/1927 | Henderson | |
| 1,876,279 A | 9/1932 | Dietrich | |
| 2,010,626 A | 8/1935 | Dietrich | |
| 2,583,654 A | 1/1952 | Korsgaard | |
| 2,722,714 A | 11/1955 | Blizzard et al. | |
| 2,722,715 A | 11/1955 | Blizzard et al. | |
| 2,723,201 A | 11/1955 | Blizzard et al. | |
| 2,819,288 A | 1/1958 | Grossmann | |
| 2,983,949 A | 5/1961 | Matecki | |
| 2,984,574 A | 5/1961 | Matecki | |
| 3,110,058 A | 11/1963 | Marbach | |
| 3,112,516 A | 12/1963 | Bonnee | |
| 3,158,896 A | 12/1964 | Marbach | |
| 3,201,825 A | 8/1965 | Riegler | |
| 3,209,398 A | 10/1965 | Ziolko | |
| 3,230,399 A | 1/1966 | Hykes | |
| 3,231,932 A | 2/1966 | Michl | |
| 3,245,108 A | 4/1966 | Voigt | |
| 3,266,911 A | 8/1966 | Clement | |
| 3,310,833 A | 3/1967 | Clement | |
| 3,411,177 A | 11/1968 | McMillan | |
| 3,454,982 A | 7/1969 | Arnold | |
| 3,461,484 A | 8/1969 | Arnold | |
| 3,528,825 A * | 9/1970 | Doughty | 53/431 |
| 3,570,046 A | 3/1971 | Bender | |
| 3,594,857 A | 7/1971 | Michl | |
| 3,619,854 A | 11/1971 | Ilgen et al. | |
| 3,682,371 A * | 8/1972 | Saika | 138/119 |
| 3,704,483 A * | 12/1972 | Urbutis et al. | 452/26 |
| 3,869,756 A * | 3/1975 | Tums | 452/26 |
| 3,907,003 A | 9/1975 | Regner et al. | |
| 3,986,230 A | 10/1976 | Riegler | |
| 3,988,804 A | 11/1976 | Regner et al. | |
| 4,075,736 A * | 2/1978 | Riegler | 452/25 |
| 4,085,483 A | 4/1978 | Winkler | |
| 4,125,130 A * | 11/1978 | Yamamoto | 138/121 |

(Continued)

*Primary Examiner*—David J Parsley
(74) *Attorney, Agent, or Firm*—Fish & Richardson P.C.

(57) ABSTRACT

A shirred fibrous food casing defines a shirred stick formed from a tubular fibrous casing. The shirred stick includes an average outside diameter at least 120% of the average inflated diameter of the deshirred casing. Additionally, the shirred stick includes an average inside diameter of at least 70% of the casing inflated diameter and a pleat pitch defined as the distance between adjacent apexes of major pleats measured on the casing after the shirred stick is deshirred.

23 Claims, 5 Drawing Sheets

U.S. PATENT DOCUMENTS

| | | | | |
|---|---|---|---|---|
| 4,164,057 A | * | 8/1979 | Frey et al. | 452/38 |
| 4,185,358 A | | 1/1980 | Regner et al. | |
| 4,210,981 A | | 7/1980 | Story | |
| 4,339,894 A | | 7/1982 | Story et al. | |
| 4,354,295 A | | 10/1982 | Kollross | |
| 4,374,447 A | | 2/1983 | Martinek | |
| 4,377,885 A | | 3/1983 | Kollross | |
| 4,466,466 A | * | 8/1984 | Raudys | 138/118.1 |
| 4,487,231 A | | 12/1984 | Wolf et al. | |
| 4,550,042 A | * | 10/1985 | Andrae et al. | 428/34.8 |
| 4,550,472 A | | 11/1985 | Temple et al. | |
| 4,551,884 A | * | 11/1985 | Kupcikevicius et al. | 452/39 |
| 4,590,749 A | | 5/1986 | Temple et al. | |
| 4,648,428 A | * | 3/1987 | Story | 138/118.1 |
| 4,683,615 A | | 8/1987 | Tomczak et al. | |
| 4,688,298 A | * | 8/1987 | Mahoney et al. | 452/21 |
| 4,759,100 A | * | 7/1988 | Beardsley | 452/21 |
| 4,802,511 A | * | 2/1989 | Hensley | 138/118.1 |
| 4,818,551 A | * | 4/1989 | Stall et al. | 426/420 |
| 5,358,765 A | | 10/1994 | Markulin | |
| 5,890,955 A | * | 4/1999 | Stanley | 452/48 |
| D413,968 S | * | 9/1999 | Lester et al. | D23/266 |
| 5,980,374 A | * | 11/1999 | Mercuri | 452/21 |
| 6,654,996 B1 | | 12/2003 | Harris | |
| 6,808,771 B2 | | 10/2004 | Auf Der Heide et al. | |
| 2004/0076723 A1 | | 4/2004 | Kollross | |

* cited by examiner

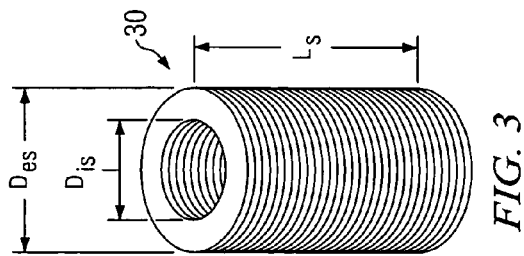
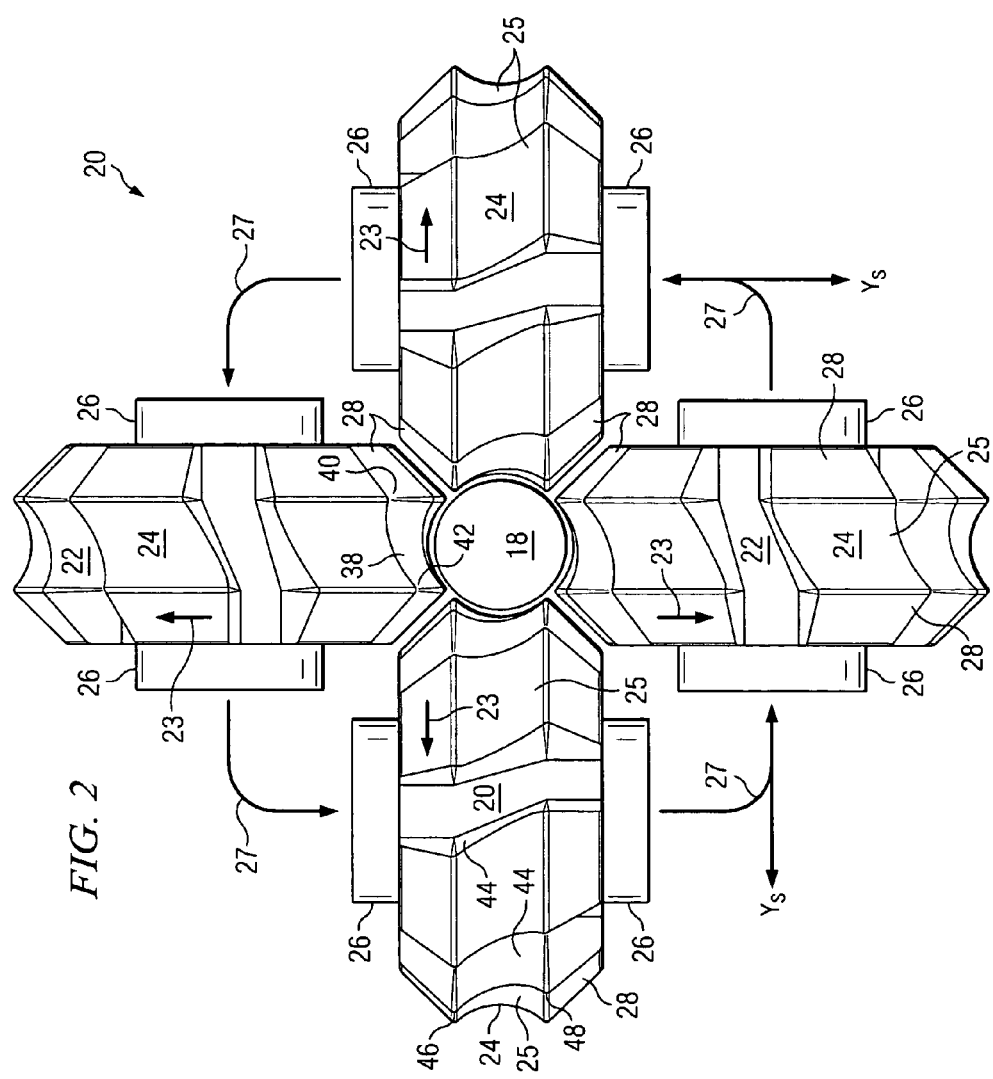

SHIRRED CASING

TECHNICAL FIELD

This disclosure relates to tubular food casings, and more particularly to an improved shirred food casing.

BACKGROUND

Artificial food casings, including plastic casings and cellulose casings, have been used for many years as containers in which food products are manufactured and stored. In commercial applications, the food casings are generally loaded either by hand or automatically into a food stuffing machine in order to stuff food products, such as sausage, meats, vegetables, or other food products, into the casings. In order to increase the length of casing that can be utilized at one time, casings have for years been compressed through ruffling or other compression techniques, into short, compact lengths, called shirred sticks or shirred strands.

Casings can be natural or artificially manufactured. Artificial casings generally fall within one of four categories: skinless cellulose casings (small calibers, pure regenerated cellulose), collagen casings (edible, non-edible, animal derivative), plastic casings (typically Nylon and PE), and fibrous casings (viscose coating on hemp paper). These casings can be used in reels, in cut pieces, or shirred (compacted) form.

Current technology for shirring skinless cellulose casings is generally disclosed by U.S. Pat. No. 3,454,982 issued to Arnold. Arnold discloses a shirring method and system that includes a plurality of shirring rolls (also called wheels or gears) that engage a casing that is inflated about a mandrel and fed through the shirring rolls. The shirring rolls have angled teeth so that as the rolls rotate, the teeth of successive wheels engage the casing to form a helical pleat, applying a vector force at a direction not parallel to the shirring mandrel. Typical skinless casings are shirred with 18%-23% moisture by weight, and do not require additional soaking prior to stuffing with food products.

Collagen casings, which are often edible and therefore are more delicate than skinless cellulose casings, are less adaptable to automatic stuffing processes. Accordingly, fewer innovations in shirring and compaction of the casings have been pursued. Typical methods for shirring collagen casings are disclosed by U.S. Pat. Nos. 3,209,398 and 4,550,472.

Polymeric plastic casings, which are gaining popularity, may be used without any soaking prior to stuffing, or may require soaking after shirring but prior to stuffing. Several shirring techniques exist for shirring plastic casings, the most notable disclosed by U.S. Pat. Nos. 3,988,804, 3,454,982, and 4,377,885.

Fibrous casings are generally manufactured by coating a hemp paper with viscose, which is then further regenerated into cellulose, and are sold as one of two types of casings. A large percentage of fibrous casing is typically pre-moisturized to 16%-18% before shirring. After shirring, the casing must be soaked to a moisture content of about 35% to 45% by weight to allow full wetting of the cellulose fibers prior to stuffing, especially important to provide elasticity to the hemp. Although both skinless and fibrous casings are cellulosic, fibrous casings are very thick, typically around 100 microns, which is about four times the thickness of skinless casings. This high thickness and stiffness of fibrous casing require adequate moisturizing to provide elasticity for functioning. Shirring techniques have generally been limited for fibrous casings of this type due to the effects of excessive compaction of casing within the shirred stick, which impedes soakability. Excessive compaction decreases the space within the pleats, thus preventing water in the soak tank from moving into the volume of the shirred stick in sufficient amounts in order to be absorbed by the cellulose. Typical shirring techniques for fibrous casings that require additional soaking after shirring are disclosed in U.S. Pat. No. 4,377,885.

The second type of fibrous casings are premoisturized prior to shirring and require no additional soaking before stuffing. Due to the fact that no additional soaking is required prior to stuffing, higher compression of the shirred stick prior to doffing from the shirring machine is a typical method of increasing the length of casing that can be loaded into a stuffing machine, because there is no further requirement for soakability, and thus no requirement for spacing between the pleats after shirring. Still, U.S. Pat. No. 4,377,885 is the most typical casing used for shirring pre-soaked fibrous casings although U.S. Pat. No. 3,988,804 is also used in selected applications.

A variety of shirring technologies therefore exist. Generally, a flattened casing is inflated with compressed air, allowing it to be fed into a shirring machine from a reel through feedrolls. As the casing moves through the feedrolls, the casing is inflated around the mandrel and engaged by mechanisms including screws, belts or teeth which are part of the shirring rolls, these shirring rolls being mounted inside a fixture called a shirring head, that pull the casing into pleats. A variety of shirring heads exist. Newer versions of the shirring heads include a plurality of shirring rolls, with each shirring roll having a plurality of teeth. Shirring heads typically attempt to achieve a continuous helical pleat implanted onto the casing by the rotation of the shirring teeth on the shirring rolls. Certain shirring heads also simultaneously rotate the shirring head around the mandrel, such as U.S. Pat. No. 4,377,885 to assist in forming this helix.

Various improvements have been made over the years with respect to shirring techniques. Though effective in increasing the compaction of casing within a shirred stick, the resultant diameter of a shirred fibrous stick is typically between 95% to 112% of the inflated diameter of the casing. The volume within the shirred stick available for packing casing depends upon shirred stick outer diameter, shirred stick inner diameter and shirred stick length, as shown in, U.S. Pat. Nos. 4,590,749 and 5,358,765. These references illustrate that for a given casing, a calculation can be made using shirred stick dimensions to estimate the density of casing compacted into the shirred stick.

In the case of fibrous casing requiring soaking prior to stuffing with meat, different types of casings require different densities (pack efficiency) within the shirred stick, to allow water to penetrate into the stick permitting full soaking. The shirred stick length and inner diameter are generally set in value according to the type of stuffing equipment used, therefore leaving the shirred stick outer diameter as the only free variable around which to increase the available volume into which casing can be packed. Various shirring techniques are able to pull the casing in a manner to form various shirred stick outside diameters. For a given type of casing shirred into a stick with a given shirred stick length and a given shirred stick inner diameter, a greater outer diameter of a shirred stick allows more available volume into which casing can be compacted, allowing either more free air volume for a given casing length (easier soakability), or conversely allowing more casing to be compacted into the stick (with equal soakability or for improved length on non-soak articles).

A significant limitation of the current technology is that casings shirred today using conventional methods do not permit long lengths of casing to be compacted within the shirred stick and still achieve adequate soaking with a desired shirred stick length and a desired shirred stick inner diameter. The excessive density of casing packed into the stick often prevents sufficient wetting of the casing during soaking.

As shirring mandrels increase in size relative to the casing diameter, to provide larger shirred stick inner diameters allowing stuffing machines to increase throughout by using larger diameter stuffing tubes, the pleats within the shirred stick geometrically become shorter and harder to pull, with less surface area available within the pleat for teeth on shirring rolls to grab the casing. With current techniques that use larger mandrel diameters relative to the casing inflated diameter, the shirring rolls are required to rotate with extremely high tooth velocities relative to the velocity of the casing in the shirring machine feedrolls in order to grab and pull the shorter pleat. Force applied is proportional to velocity squared, so high differential velocity between the shirring teeth and the feedrolls greatly improve forces to adequately grab the casing. The difference in velocity of the shirring tooth verses the velocity of the casing at the feedrolls is generally referred to as "overshirr."

The result of the high overshirr of the shirring rolls required to pull the casing is that a high number of relatively short pleats are formed, including forming a large number of non-uniform or "nuisance" pleats that create stress on the casing due to irregular folding, impeding water absorption by blocking passageways for water penetration into the stick by capillary action, and retarding efficiently compacting long lengths of casing into the shirred stick without damage, since each pleat or fold adds corresponding nuisance pleats. This is further impeded because as the casing absorbs water, the cellulose structure swells up, and the fibrous casing thickness often increases by 50% to 100% of its original thickness, further restricting passage of water into the interior of the shirred stick. Once the passageways close due to casing swelling, absorption of water stops, limiting the casing at some final moisture level below desired full wet-out which is required to achieve sufficient wettability. With fibrous casings shirred by prior art, the length of casing that could be shirred into the stick was limited below some desired value, to reduce compaction to allow improved soakability, allowing more free air space around the pleats for water penetration into the shirred stick.

When the shirred stick is deshirred (i.e. unpleated by extending the shirred stick to its full length without stretching the casing material), the helical pattern of the pleat ridge can be seen. The distance between major pleats along the longitudinal axis may be called the pleat pitch. Additionally, the existing technology, as described above, typically produces a pleat length or "pleat pitch" in fibrous casing that is only 50% to 80% of the dry flat width of the casing, using conventional shirring mandrels with ratio of shirring mandrel diameter to inflated casing diameter of 60% to 85%. As the shirring mandrel increases in diameter, the pleat pitch generally shortens due to geometry of the stick. Commercial shirring mandrel diameters range from 60% to 85% of the deshirred casing's diameter, that diameter being measured with low pressure inflation or determined mathematically from the lay-flat condition.

In addition to the problems noted above with respect to compaction, excessive abrasion and damage resulting in pinholing occurs when the shirring rolls and teeth have a much higher velocity than the velocity of the casing fed from the feedroll (i.e.: high overshirr). In the case of high overshirrs, abrasions on the surface of the casing are a significant problem aggravated by the excessive differential velocity of shirring tooth verses incoming casing. Using current technology, if overshirr is excessive with a given number of teeth, creating excessively high shirring tooth velocities relative to the feedroll velocity, the only method of operating with reduced overshirrs and still obtain a desired pleat pitch is to add more shirring teeth to the shirring roll, which will help to shorten the pleat length for a given velocity to conform to the ideal geometric requirement, but has limited pulling power since shorter pleats which are harder to pull typically require higher overshirrs just to grab the casing. Thus, although adding teeth results in reducing overshirr requirements, serving to shorten the pleat pitch as geometrically required when shirring mandrel diameter increases relative to the casing inflated diameter, this action also greatly reduces the pulling power of the shirring head.

An alternate to conventional technology disclosed in U.S. patent application Ser. No. 10/398,244 to Kollross uses a vacuum assist to create a pleat pitch and stick outer diameter greater than conventional art, but has only demonstrated this technology with very small ratios of shirring mandrel diameters to inflated casing diameter, such as 50% to 60%. With respect to Kollross's vacuum assist shirring, the very slow speeds at which the shirring machine overall operates, creating a very low productivity coupled with the enormous power requirements for vacuum shirring result in a shirring method that is not commercially viable. Accordingly, conventional technology remains the most secure method to shirr casing for all varieties of casings and mandrel combinations.

SUMMARY OF INVENTION

A fibrous food casing is shirred to define a shirred stick. The shirred stick is formed from a tubular fibrous casing having an inflated diameter, and is substantially tubular with a helical pleat ridge about a longitudinal axis of the casing when the casing is in a deshirred state. The shirred stick includes an average outside diameter at least 120% of the average inflated diameter of the deshirred casing as measured along the longitudinal axis. Additionally, the shirred stick includes an average inside diameter of at least 70% of the casing inflated diameter and includes a pleat pitch defined as the distance between adjacent apexes of major pleats on the casing when the shirred stick is deshirred. The shirred stick outside diameter may be about 130% of the casing inflated diameter. Additionally, the pleat pitch may be at least 120% of a theoretical pleat pitch (defined following). In various implementations, the average inside diameter of the shirred stick may be at least 80% of the casing inflated diameter, and the shirred stick outside diameter may be at least 115% of the casing inflated diameter.

A method for shirring a fibrous casing which includes feeding a casing through one or more feedrolls onto a mandrel at a feedroll velocity, is included. The mandrel has a longitudinal axis and a mandrel diameter. The casing is inflated into a tubular form about the mandrel. The mandrel diameter is between 60% and 90% of the deshirred casing inflated diameter, but the casing inflated diameter during shirring may be slightly larger than the casing inflated diameter after shirring, since shrinkage has not yet occurred. The casing is directed into a shirring head with shirring rolls rotating in the direction of the mandrel longitudinal axis. The shirring head includes a plurality of shirring rolls disposed in a substantially uniform displacement around the mandrel and a plurality of shirring teeth disposed about the perimeter of each of the shirring rolls. The shirring rolls rotate with a shirring roll velocity measured at the root of the shirring passageway on the teeth when the shirring teeth are proximate to the mandrel. The inflated casing is pulled into a shirred stick with the shirring teeth so that the shirred stick created has an outside diameter of at least 120% of the casing inflated diameter. The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a front view of a shirring head.

FIG. 3 is a perspective view of a shirred casing.

Like reference symbols in the various drawings indicate like elements.

DETAILED DESCRIPTION

Figure 1A:
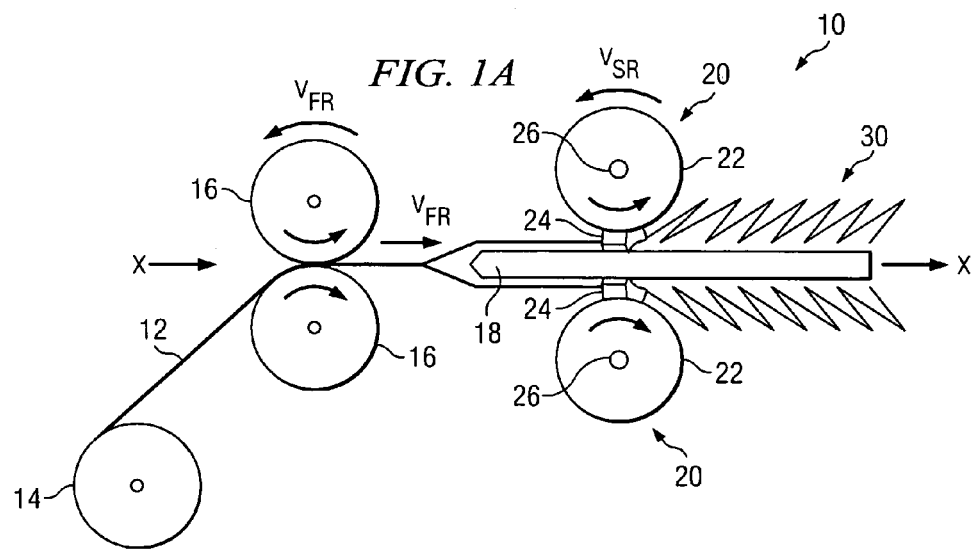
FIG. 1A is a side view of a system for shirring food casings.
Figure 1B:
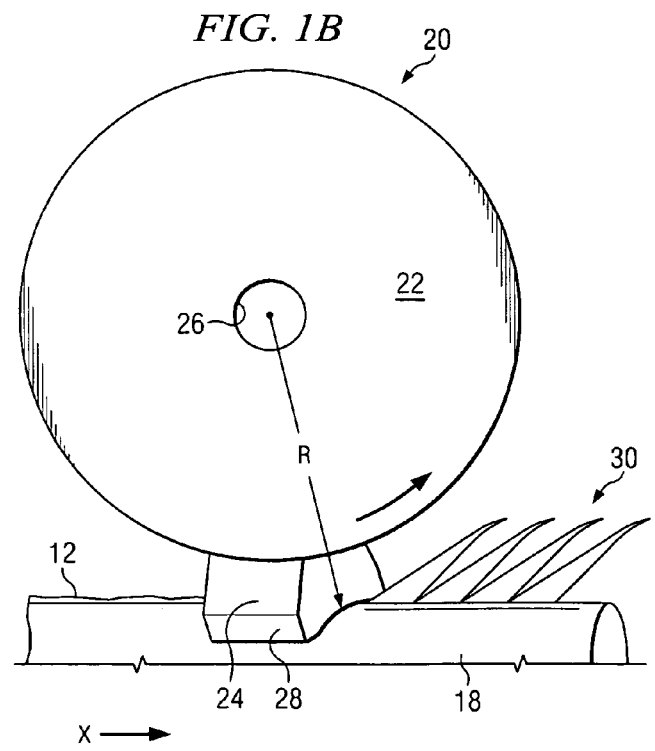
FIG. 1B is a detail view of a portion of the shirring system of FIG. 1A.

Improvements in shirring heads may be seen in improvements over U.S. Pat. Nos. 3,454,982 and 3,461,484, which disclose shirring technology. For example, FCT, Inc. of Naperville, Ill. sells an improved shirring roll that includes shirring teeth that form a continuous spiral upon rotation of the shirring rolls by using a biaxially curved tooth face that provides full edge to edge bevel contact at the edges of teeth on adjacent rolls. Following technology originally disclosed by Arnold in U.S. Pat. No. 3,454,982, these rolls shirr with clearances of 1.75 mm between the root of the tooth and the shirring mandrel, verses normal clearances in conventional technology of 2.75 to 4 mm. This lower clearance allows better gripping of the casing, allowing pulling with very low overshirrs, though other methods may also work.

Referring to FIGS. 1A, 1B, 1C, and 2, a shirring system 10 includes a casing 12 fed through the shirring system 10 from a casing reel 14. Feedrolls 16 guide the casing 12 in a flattened state onto a mandrel 18 along axis X. The feedrolls 16 are rotating at a constant angular velocity that imparts a linear velocity $V_{FR}$ to the casing 12, propelling the casing 12 along the shirring mandrel. Additionally, as the casing 12 is fed onto the mandrel 18, the casing 12 is inflated into a tubular form by compressed air after it passes through the feedrolls 16.

Figure 1C:
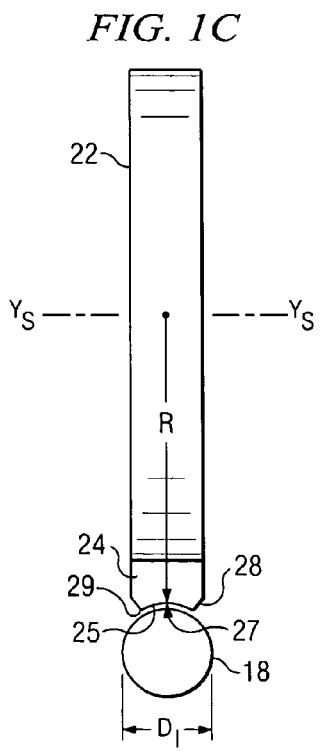
FIG. 1C is an end view of the portion of the shirring system depicted in FIG. 1C rotated 90°.

Referring to FIGS. 1A, 1C and 2, a shirring roll 22 includes at least one shirring tooth 24. The shirring teeth 24 may be manufactured from metal, plastic, ceramic, or polymer compounds, such as urethane or rubber. Each tooth 24 includes a tooth face 25, a beveled edge 28 proximate to an adjacent shirring roll 22, a front surface 38 and a rear surface 44. Additionally, each tooth 24 includes a tooth root 27 and tooth tips 29. The tooth tips 29 are located at the point at which the beveled edge 28 meets the tooth face 25. The front surface 38 includes lead edges 40 and 42, and the rear surface 44 includes trail edges 46 and 48. The curvature of the tooth face 25 allows the beveled edge 28 corresponding to the lead edges 40 and 46 of a shirring tooth 24 to form a substantially continuous spiral around the mandrel as the shirring rolls 22 rotate by contacting the beveled edge 28 corresponding to the trail edges 46 and 48 of a shirring tooth 24 on an adjacent shirring roll 22.

The shirring rolls 22 are phased so that a beveled edge 28 of a shirring tooth 24 on one roll abuts the beveled edge of a tooth 24 on an adjacent shirring roll 22 when the beveled edges 28 of each tooth 24 are proximate to the mandrel 18. Therefore, as the shirring teeth 24 rotate about the axis of their respective shirring rolls 22, the faces 25 of the shirring teeth 24 thus create a helical pattern about the mandrel 18. The shirring head additionally may rotate about the mandrel 18 as shown by directional arrows 27. Accordingly, the casing is always presented with a helical support face by the rolls. This helical spiral pattern imparted by the shirring rolls onto the casing greatly improves compaction of the casing into a shirred stick, and has shown to have improved pulling power since the casing is being directed into the helical pleat by full angular tooth contact matching closely the helical spiral.

Figure 6:
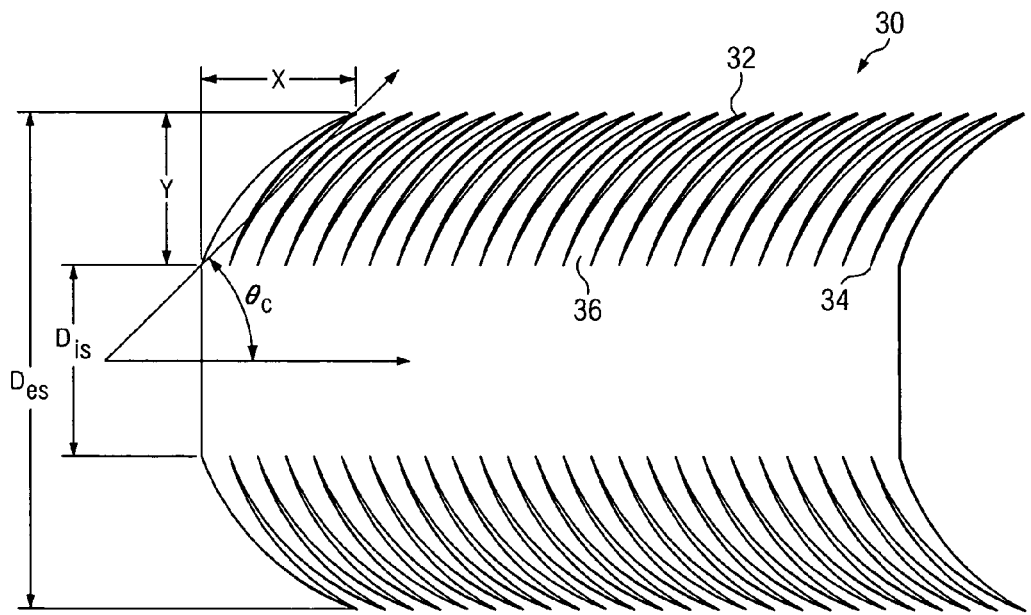
FIG. 6 is a cross-sectional view of a portion of shirred casing.

As discussed above with respect to FIGS. 1A-2, the action of the various shirring mechanisms all serve to create a series of pleats defined by pleat ridge 32 in the shirred stick 30. A cross-sectional view of the shirred stick 30 is shown in FIG. 6, in which the pleat ridge 32 defines a plurality of major pleats 33 having an apex at the pleat ridge 32. Thus, the pleat ridge 32 defines a major pleat 33 that corresponds to an adjacent minor pleat 34 to define a pleat cone 36.

The pleat cone 36 has a corresponding cone angle $\theta_c$, which is typically between about 20° to 40°, and most preferably 25° to 30°, disregarding distortion from excess compression which artificially may increase cone angles, often with other undesirable effects such as aggravation of pinholes. Additionally, the shirred stick 30 has an exterior diameter $D_{es}$ and an interior diameter $D_{is}$. The stick interior diameter is typically 2% to 5% less than the shirring mandrel diameter, depending upon various shirring techniques, various casings and conditions, and due to factors such as casing thickness, pre-shirring moisture content, and rebound after doffing the shirred stick from the mandrel. The cross-sectional view presented in FIG. 6 shows the accordion-like pleats 32 in compressed form. It should be noted that the plurality of pleats 32 may be seen to have an accordion-like shape when the shirred stick 30 is viewed from a cross-sectional perspective, such as in FIG. 6.

In actuality, if the shirring roll teeth are perpendicular to the mandrel such as in Kuko's axial shirring system, the shirring head must rotate around the mandrel axis to impart the required helical pattern onto the stick. If the shirring teeth are obliquely angled relative to the mandrel (per Arnold) the shirring head does not need to rotate around the mandrel axis to impart a helical pattern, but may rotate around the mandrel axis for other factors to affect the pleating.

Figure 4:
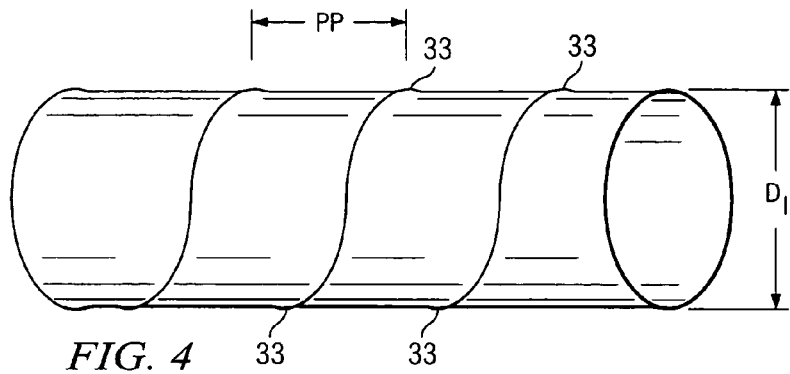
FIG. 4 is a portion of deshirred casing.
Figure 5:
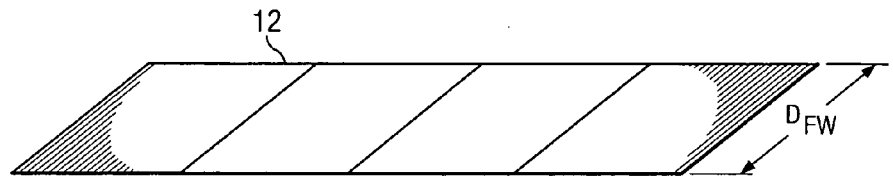
FIG. 5 illustrates a flattened portion of casing.

Referring to FIG. 4, when the shirred stick 30 is deshirred (i.e. unpleated by extending the shirred stick to its full length without stretching the casing material), the helical pattern of the pleat ridge 32 can be seen. The distance between major pleats 33 along the longitudinal axis may be called the pleat pitch PP. In previous applications of shirring technology, the pleat pitch was approximately equal to, or more commonly smaller than the flat width of a flattened deshirred casing, commonly called the dry flat width DFW, and illustrated in FIG. 5. On skinless cellulose casings, where casing does not need to be soaked, pleat pitches typically range from 60% of DFW to 80% of DFW, occasionally reaching 100% of DFW. The maximum pleat pitch seen on fibrous casings in known shirring applications was through the use of a vacuum assisted shirring process by Küko Maschinenbau, and exhibited a 100% pleat pitch-to-DFW ratio for a casing with a DFW of 65 mm and a pleat pitch of 65 mm. The Küko shirring system, however, had to operate at very slow velocities with very small shirring mandrel diameters in order to allow the vacuum port to engage the casing to pull the casing into pleats. This was not commercially acceptable, due to insufficient shirred stick interior diameter and slow operating speed. These high pleat pitch-to-DFW ratios were due primarily to the fact that the shirring rolls had vacuum assist to help hold the casing against the tooth, allowing pulling casing with slower than normal rotation velocities, typically reaching as low as 130% overshirr. This low overshirr was facilitated by the vacuum preventing casing slipping from the tooth. Additionally, the mandrel diameter used to achieve the longer pleat pitch in the Küko process was only about 55% of deshirred casing inflated diameter, much smaller than the 70% value typically encountered as minimum for commercializing. So although this small mandrel diameter set-up will lengthen the pleat pitch, it also creates a product unusable commercially and costly to manufacture due to the very slow shirring machine speed.

The ratio of shirring roll velocity measured at the tooth passageway root $V_{SR}$ to feedroll velocity $V_{FR}$ is called overshirr. Stated alternatively, overshirr is the ratio of excess velocity of the tooth on the shirring roll with respect to the incoming casing. The overshirr is also approximately equal to the ratio of the distance between teeth on the shirring roll to pleat pitch and can be shown by the formula:

Overshirr=Tooth Pitch (Circular) Distance leading edge to leading edge/$PP$, (1)

where

Tooth Pitch Distance=Roll Tooth Diameter×π/Number of Teeth.

Additionally, the theoretical pleat pitch may be calculated by the formula:

$$PP=2\times D_M((D_I/D_M)^2-\cos^2\theta_c)^{1/2}-\sin\theta_c)\times 1.3,\quad (3)$$

where $D_M$ is the average diameter of the mandrel, $D_I$ is the casing inflated diameter, and $\theta_c$ is the cone angle, as discussed above and clarified in U.S. Pat. No. 4,210,981 issued to Story. Note that in formulas (1) and (2), the tooth pitch distance is calculated along the arc of travel of the teeth. Accordingly, the distance from the root of one tooth to the root of an adjacent tooth, is measured along the arc of a theoretical circle that is defined by the location of the root of the passageway of the shirring teeth about the shirring roll. This calculation of tooth pitch may be determined as diameter from the root of the tooth passageway to the shirring roll centerline×2π divided by number of teeth on the roll.

The casing inflated diameter may be determined by measuring the diameter of the casing in a deshirred state with a minimal air pressure applied within the casing. Alternatively, the casing inflated diameter may be determined by multiplying the dry flat width of the casing by 2/π. The 1.3 factor compensates for the slight arc shape of the cone, and for wrinkles, and has been derived by practical experience. Thus, as the diameter of the mandrel approaches the inflated diameter of the casing, the theoretical pleat pitch becomes zero. For purposes of calculation, the cone angle $\theta_c$ is approximated at 27%, based on the velocity of the casing and the diameter of the shirring rolls. Generally, cone angles on fibrous shirred products are between 25° to 35°. Actual measurements of the cone angle θ may be made by the following formula with reference to FIG. 6:

ARCTAN $[(D_{es}-D_{is})/2]/X$, wherein X is the distance along the longitudinal axis of the shirred stick from the outer edge of the stick to the first pleat crest on the shirred stick outside diameter and where $D_{es}$ is shirred stick outside diameter, $D_{is}$ is shirred stick inside diameter, both measured as the average of several readings made with calipers, applying gentle pressure to the shirred stick surface as is common in the industry.

The theoretical pleat pitch shows the expected pleat pitch based on the mandrel diameter, the inflated diameter, fabricated normally resulting cone angle. A detailed discussion of the theoretical pleat pitch may be found in U.S. Pat. No. 4,210,981 issued to Story.

Figure 7:
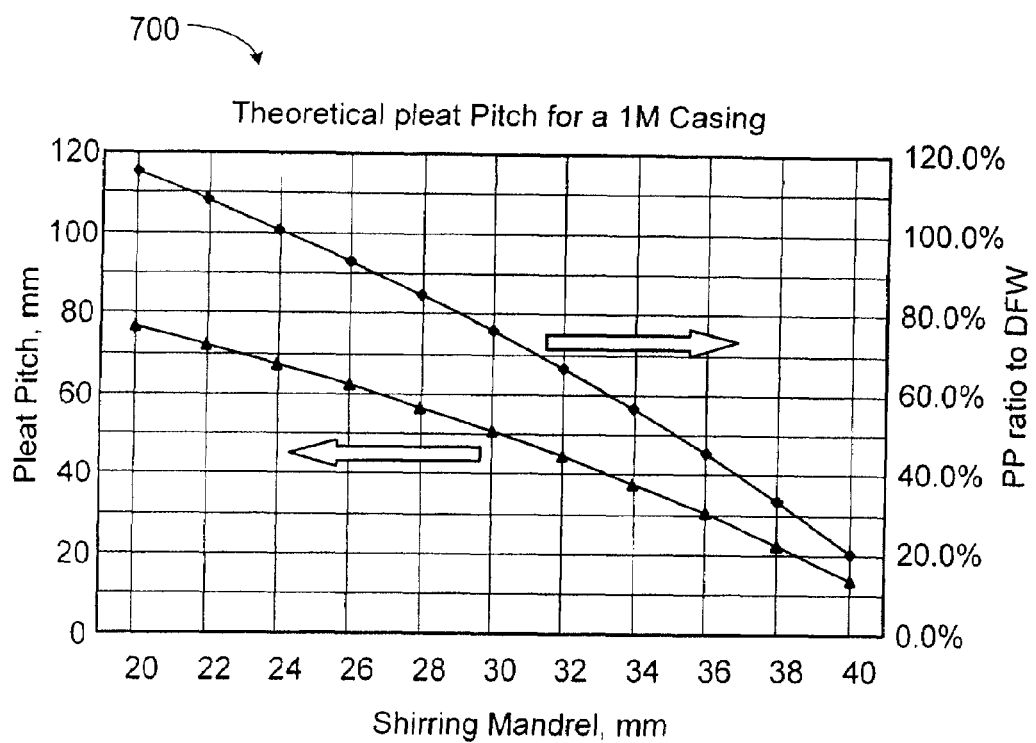
FIG. 7 is a graph illustrating a theoretical pleat pitch ratio for a 1M casing.

Based on the formula (3) for pleat pitch, it can be seen that for a fibrous casing having the following properties, 86 micron thickness prior to shirring, DFW=69.8 mm, DI=43 mm, as the mandrel diameter DI increases in size, the theoretical pleat pitch PP decreases both in length and as a ratio of PP-to-DFW as shown in graph 700 of FIG. 7.

It can thus be seen in graph 700 of FIG. 7 that the theoretical pleat pitches larger than the dry flat width can only be achieved with a mandrel with a very small diameter relative to the casing inflated diameter based on the formula for theoretical pleat pitch, but these mandrels have little commercial value since the resulting stick must be used in meat processing on a very small diameter stuffing tube that would greatly retard productivity. Additionally, the pleat pitches in conventional art remain close to values predicted by the theoretical pleat pitch as disclosed by the formula above.

An end view of a pleat would be expected to have a circular cross-section such as shown in U.S. Pat. No. 2,983,949. The model for the maximum outside diameter of a shirred stick, applicable typically when shirring mandrel diameters are 70% to 85% of casing inflated diameter, with casing using a circular pleat shape is estimated as [2×Casing Inflated Diameter−Mandrel Diameter]. Any value exceeding this indicates high pulling power, such as sufficient to create an ovate pleat shape, also as described in U.S. Pat. No. 2,983,949. Surprisingly, the pulling power of the spiral shirring rolls is sufficient to deform the tubular casing from normal circular cross-section into oblong or elliptical major pleats without the need for vacuum or other technology that increases the friction between the casing and the shirring teeth. This deformation of the cross-sectional area of the pleats results in formation of a larger outer diameter of the shirred stick than is predicted by the formula for the maximum outside diameter as can be seen by the following examples.

EXAMPLES

Three tests were performed resulting in the following examples. The first two tests comprised a test using a conventional axial shirring rolls and a second test using spiral shirring rolls on the same casing type using a mandrel with the same diameter in both tests. The third test was conducted with a larger diameter mandrel and larger casing. Each of the casings used in the following examples was a fibrous casing. However, other types of casing may be used. The casing type for the first two tests was a Teepak 1M fibrous casing, which has the following properties:

DFW=69.8 mm (deshirred casing)
$D_I$=43 mm
Casing Thickness=86 microns at 16% moisture, prior to soaking
$D_M$=35.5 mm
$D_M/D_I$=82.5%

Example 1

Standard KüKo Axial Shirring Head

The first test was conducted using an axial shirring head as described above with respect to FIGS. 2A-2B. The shirring machine was the Küko 5 distributed by Küko Maschinenbau, (no longer commercially active), with the above-stated 35.5 mm mandrel with a Teflon coating. The casing was pre-moisturized to an average of 16% water to casing by weight, and of the type requiring soaking after shirring and prior to stuffing.

The casing was fed into the shirring machine at a velocity of $V_{FR}$=145 m/min, and the shirring roll velocity $V_{SR}$=346 m/min, for an overshirr of 238.6%. The clearances between the shirring teeth and the mandrel were 2.5 mm as measured with the shirring teeth proximate to the mandrel. Standard clearances using the existing shirring methods are about 2.5 mm to 5 mm to prevent the casing from bunching or becoming jammed in the shirring machine at the shirring head. This overshirr can also be determined by measuring the pleat pitch of the shirred stick and inserting the value into formula (1) above, where the tooth distance (determined as diameter from root passageway to shirring roll centerline multiplied by 2 π, then divided by number of teeth on the roll) was 82.3 mm from front lead edge to front lead edge of teeth on the same shirring roll. Accordingly, the overshirr=82.3 mm/34.4 mm=238.6%. Overshirr is typically between 150% to 250% with conventional technology.

As is typical for large ratios of mandrel diameter to casing diameter, a very large overshirr is required to compensate for the relatively poor ability of an axial shirring head to pull and pleat a casing. Accordingly, for mandrels with a diameter more than about 80% of the casing inflated diameter under prior art methods typically require overshirrs of 200% or more to produce sufficient pulling power to pull the casing into pleats. The theoretical pleat pitch, as described for the example above, is 32 mm for a mandrel having a diameter that is 82.5% of the inflated casing diameter. Accordingly, the pleat pitch for the test was 106% of theoretical PP, and the PP-to-DFW ratio was 34 mm/69.8 mm=42.8%. Accordingly, the axial shirring rolls moving at such high speeds were able to impart a slight deformation of the otherwise circular cross section of the inflated casing. After shirring, the outside diameter of the shirred stick was about 49 mm, and therefore about 114% of the casing inflated diameter as measured after shirring.

Example 2

Improved Shirring Method and Casing

Surprisingly, it has been discovered that by using the continuous spiral shirring head 20 illustrated by FIGS. 2A-2C above, and reducing the clearance between the shirring teeth 24 and the mandrel 18, shirred sticks 30 having pleat pitches far larger than the theoretical pleat pitch described above may be obtained. The most significant result of the longer pleat pitch is the ability to obtain shirred sticks 30 with outside diameter more than 15% greater than the casing inflated diameter on mandrels that have a diameter of at least 70% to 80%, and even as great as 90% of the casing inflated diameter. It is advantageous for the outside diameter of the shirred stick to be large, to achieve a volume in the shirred stick in which to pack casing, as discussed below, to be able to properly moisturize a casing that is designed to be soaked after shirring. Accordingly, with larger stick outer diameters more casing length can be metered into the shirred stick while retaining sufficiently low casing density without reducing shirred stick inside diameters to allow proper soaking (moisture levels after soaking of 25% to 40% by weight) of the fibrous casing after shirring. The larger mandrel diameters create shirred sticks with larger inner diameters, and is desirable because a shirred stick with a larger inside diameter allows the casing to be stuffed on a larger stuffing horn. As stuffing technology improves, larger diameter stuffing horns are used to allow greater pressure to be used with emulsions that have a greater viscosity (such as extremely cold emulsions).

Previous attempts to reduce substantially the clearance between the teeth and the mandrel were contrary to conventional knowledge because although pulling power is increased, the shirring rolls lack the geometry to scientifically lay the pleat formed ahead of the tooth onto the shirred stick cone without the casing becoming jammed or stuck between the feedrolls and the shirring rolls. The spiral shirring rolls which was developed for use on a shirring machine that originally used standard KüKo axial shirring rolls, can be adjusted to reduce overshirr and increase the pleat pitch of casings shirred on the machine. Additionally, casings can be shirred by the shirring rolls in which the shirring head does not rotate around the mandrel axis, unlike the Küko axial head which must rotate around the mandrel axis in order to work. The results are similar if the spiral shirring head rotates, or does not rotate around the mandrel axis, following the precepts of Arnold's shirring rolls disclosed in U.S. Pat. No. 3,454,982. In Arnold's system, the shirring head does not necessarily need to rotate around the mandrel axis to aid in forming the helical pattern on the shirred stick because the teeth are obliquely angled to be able to accomplish the helical pleat. In accordance with the present invention, an exemplary test was performed to show the improvements in both the method and system for shirred casings, as well as the improved shirred casings themselves.

For the implementation discussed Examples 1,2 and 3 all used the same shirring head fixture 20. For Example 2, the shirring rolls were designed to have clearances of 1.75 mm between the shirring tooth root 27 and the mandrel, and 2.02 mm between the edges 40-46 and 42-48 of the shirring tooth 24 and were mounted into the same KüKo shirring head as were the KüKo shirring rolls mounted. In Example 1, the Küko axial shirring rolls were mounted in the head and had clearances of 2.5 mm at the root. The use of reduced clearances in Example 2 are possible due to the width of the tooth and the increased pulling power achieved by the design of spiral shirring rolls. It was unexpectedly discovered that the spiral shirring rolls 22 at the reduced clearances allows the shirring system 10 to operate at a very low, and even negative overshirr, or stated alternatively, an overshirr of less than 135%, and as low as 95%. The overshirr in the instant example was 98%. Additionally, acceptable results can be obtained at overshirrs of about 130% or less, which is half of the typical overshirr for a mandrel diameter that is 80% of the inflated diameter of the casing, as in this example. Thus, lower or even slightly negative overshirrs allow the pleat pitch to be greatly lengthened, permitting the shirring rolls to turn very slowly relative to the feedrolls yet still pull the major pleats 32 with the shirring teeth 24. Low overshirrs approaching 100% are unusual, since not all the pleat surface is contacted and directed by the shirring tooth, onto the pleat cone, which conventionally creates jamming during shirring.

In Example 2, the shirring rolls 22 were operating at a tooth velocity of $V_{SR}$=142 m/min compared to the feedroll velocity of $V_{FR}$=145 m/min. The resultant overshirr was $V_{SR}/V_{FR}$=98%. The resulting pleat pitch PP=86 mm, which was 269% of the theoretical PP of 32 mm. The distance between the leading edges 40 on successive shirring teeth 24 on each shirring roll 22 was 84.4 mm, (determined as diameter of root of passageway to shirring roll centerline ×2π divided by number of teeth on the roll), which confirms the overshirr of 98% by the formula (1) above wherein Overshirr=Tooth Distance/Pleat Pitch=84.4 mm/86 mm=98%.

One of ordinary skill in the art would not have attempted an overshirr of less than 150%, because of the extremely high ratio of mandrel diameter to inflated casing diameter. Accordingly, the results of Example 2 are plotted on graph 800 in FIG. 8 of theoretical pleat pitch according to the formulas provided above.

Figure 8:
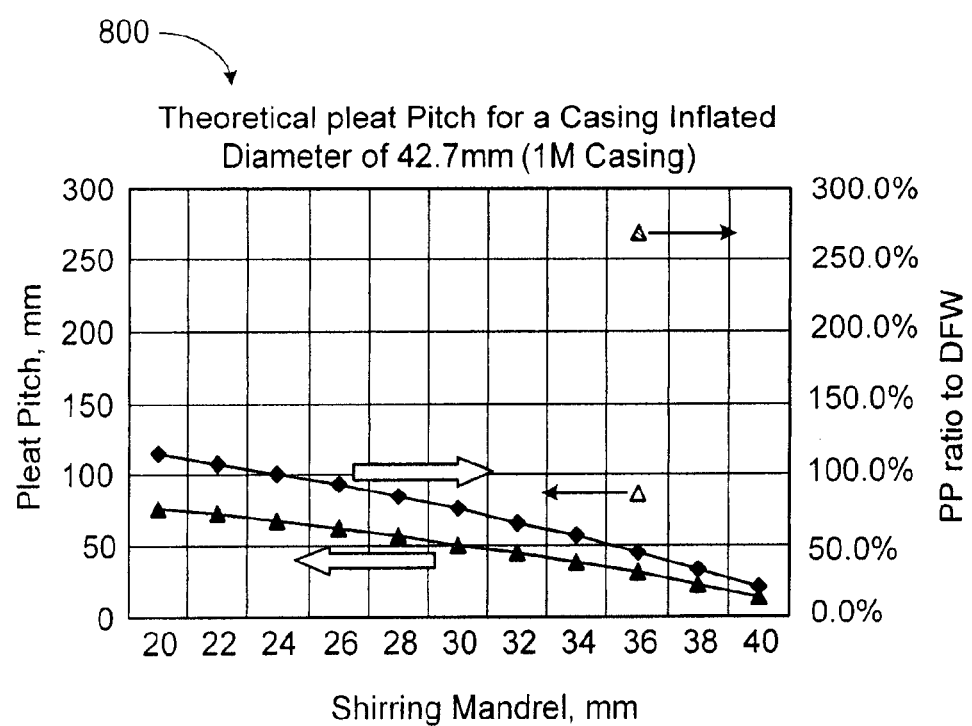
FIG. 8 is a graph illustrating the performance of a 1M casing according to the specifications to Example 2.

As can be seen from graph 800 of FIG. 8, the theoretical pleat pitch and the ratio of theoretical pleat pitch to DFW, respectively, are plotted for a 35.5 mm mandrel for a 1M casing. Graph 800 of FIG. 8 shows how the extraordinary performance of the casing shirred in Example 2 compares with the theoretical values for the pleat pitch and pleat pitch-to DFW ratios, with Example 1 having verified this theoretical value.

Based on the formula (3) for theoretical pleat pitch and graph 800 of FIG. 8 showing the results of Example 2, it should be understood that the theoretical pleat pitch decreases to zero when the diameter of the mandrel approaches the casing inflated diameter. This also means as the pleat pitch reduces in absolute length, the ratio of pleat pitch to DFW concurrently reduces. While this holds true for shirred casings according to implementations of the present invention as well, the outside diameter of the shirred stick 30 made with the invention will always be greater than the outside diameter of shirred sticks manufactured according to the prior art for all commercial combinations of mandrels used, due to the increased and more efficient pulling power of the spiral shirring rolls.

Example 3

Improved Shirring Method and Casing

A third test was performed with a casing with an inflated diameter $D_I$ of 46.2 mm. The values of the relevant variables for this test were:

$D_M$=37.5 mm
$D_I$=46.2 mm
$D_M/D_I$=81.2%

Again, reducing the overshirr to 129% the resulting shirred outer diameter $D_{es}$ was 54 mm, which was greater than the prior art at 51.5 mm. With example 3 the ratio of mandrel diameter to inflated casing diameter was 81.5%. The theoretical pleat pitch for this casing, according to formula (3), was 37.9 mm. After shirring, the shirred stick had a pleat pitch of 65 mm, which was 172% of the theoretical pleat pitch. Also, the DFW was 72.5 mm, which translates to a pleat pitch-to-dry flat width ratio of over 90%. More significantly, the shirred stick also had a ratio of shirred stick outside diameter-to-inflated casing diameter of 117% based on the $D_I$ of 46.2 mm.

The casing was shirred with a moisture content of approximately 18% by weight, so removing the shirred stick from the 37.5 mm mandrel, the interior diameter of the shirred stick rebounded to 34.5 mm, which is still large enough for cold-stuffing applications.

Discussion of Results

Referring to FIGS. 3 and 4, casing wettability is a function of the density of casing in the shirred stick, and of the type of shirring technique employed in the shirring process. The density of the casing and air which are compacted into the shirred stick is conventionally known as "pack efficiency." After shirring, the shirred sticks 30 are typically bound by a net or other restricting device, and soaked in water at typically 120° F. for approximately 30 minutes, which is the industry standard, although various combinations exist. The volume available to pack casing in a shirred stick 30 as shown in FIG. 3 may be determined by the formula $(D_{es}^2 - D_{is}^2)\pi/4 \times L_s$, where $D_{es}$ is the exterior diameter of the shirred casing, $D_{is}$ is the interior diameter of the shirred casing, and $L_s$ is the length of the shirred stick, as measured along the longitudinal axis. Various casing types require different available volumes created by the shirred stick prior to soaking, since various casings swell differently upon absorption of water. As discussed above using larger mandrels for shirring, such as mandrels with ratios of mandrel diameter to casing inflated diameter of 70%, 80%, or greater, increases the difficulty of obtaining greater values for the Shirred Stick Outer Diameter $D_{es}$. In accordance with Examples 1 and 2 described above, 129 feet of casing was easily metered into the shirring machine, and subsequently soaked successfully, and the final length $L_s$ of the shirred stick 30 was approximately 38.14 cm or 1.25 ft maintaining the correct shirred stick inner diameter.

The shirred stick 30 absorbs water through capillary action through the air spaces between the pleat ridges 32. Soaking occurs from both the spaces within the cone 36 as defined by the minor pleats 34, and in the spaces between the major pleats 33 on the exterior of the shirred stick 30. In the casing used in Example 2, the wetting is more rapid from the interior of the casing, because the interior of the casing 12 has a thinner coating of viscose than the exterior when prepared for commercial stuffing applications. Accordingly, paper fibers can protrude through the viscose and assist absorption by wicking water into the space of the pleats 32. The longer pleat pitches and greater stick outside diameter of Example 2 were essential in the increased soaking properties of the casing. This increased soakability is a function of the longer pleat pitch, which help to create a larger stick outer diameter, which then allowed longer lengths of casing to be shirred with less compaction, so that pack density was reduced. The longer pleat pitch resulted in fewer pleats in number, greatly reduced nuisance pleats, and by eliminating unwanted folds and creases also allowed larger unrestricted spacing for moisture to travel between the pleats to affect more thorough soaking, as well as helping to increase shirred stick outer diameters.

The shirred casings 30 produced by the method of Example 2 provided unexpected and desirable properties for food casings. For example, the long pleat pitch PP of 86 mm resulted in shirred stick 30 having an outside diameter Des $D_{es}$ of about 53.5 mm. Upon removing the shirred stick 30 from the mandrel 18, the inside diameter $D_{is}$ of the shirred stick 30 was 33.5 mm. Accordingly, the shirred stick 30 had a volume available to pack casing determined by $[(\text{Stick OD})^2-(\text{Stick ID})^2] \times \pi/4 \times \text{Stick Length}$. Accordingly, the volume of the shirred stick 30 produced by the method described in Example 2 was 521 cm$^3$ verses prior art volume 383 cm$^3$. The following table illustrates the improved characteristics of the implementation shown by Example 2 (Invention) as compared to Example 1 (Conventional).

|  | Conventional | Invention |
| --- | --- | --- |
| Pleat Pitch vs Theoretical | 106% | 269% |
| Stick OD, mm | 49 mm | 53.5 mm |
| Shirring Mandrel Diameter | 35.5 mm | 35.5 mm |
| Stick ID after shirring, mm | 33.5 mm | 33.5 mm |
| Casing Inflated Diameter, mm | 42.7 mm | 42.7 mm |
| Overshirr (ratio shirring tooth speed at the mandrel to feedroll speed) | 239% | 98% |
| Actual Pleat Pitch, mm | 34 mm | 86 mm |
| Ratio pleat Pitch to DFW | 51% | 128% |
| Number of Pleat Spirals in the stick | 1156 | 457 |
| Theoretical dry casing thickness at the mandrel, all pleats combined | 175 mm | 69 mm |
| Dry Air passageway size (approx) at mandrel | .076 mm | .193 mm |
| Volume in Shirred Stick available to pack in casing, cubic centimeters | 383 cm$^3$ | 521 cm$^3$ |
| Shirred Stick Surface in contact with Water for soaking, inside + outside | 987 cm$^2$ | 1041 cm$^2$ |

The increased volume in the shirred stick 30 available to pack casing permits increased soaking properties. To perform properly in commercial stuffing applications, a shirred stick 30 that is made from fibrous casing must be able to retain at least 35%, and preferably about 40% water to casing weight after soaking and/or shirring. Some fibrous casings, when shirred with about 16% to 18% moisture content, are later soaked in water in a soak tank as is conventionally known in the industry. A soak tank temperature of 120° F. for approximately 25-35 minutes (30 minutes was used in the Examples above), which is typical in the industry for soaking casings for commercial stuffing applications. The shirred stick 30 was soaked according to the industry standard and retained at least 40% water to casing weight. Additionally, in Example 2 the pleat length is at least 269% of theoretical, and 163% greater than the pleat pitch produced by the prior art method of Example 1.

Additionally, Example 3 using a slightly larger caliber casing on a slightly larger mandrel with 110 feet metered in, achieved a shirred stick outside diameter of 54 mm, verses prior art technology achieving a shirred stick outside diameter of 51.5 mm, which translated to a volume available to pack casing of 459 cm$^3$ verses prior art of 379 cm3. The prior art casing would not permit 110 feet of casing to properly soak, whereas the Example 3 casing soaked well.

The values for shirred fibrous casing pleat pitches are extraordinary for both of the examples above, as it is well known that pleat pitches manufactured using prior art methods can produce pleat pitches of no greater than about 120% of theoretical, and in no case have machine-shirred fibrous casings been produced with a pleat pitch more than 130% of the theoretical pleat pitch. For example, pleat pitches manufactured according to the method used in Example 2 may attain at least 200% of the theoretical pleat pitch, and, as in the example, greater than 250% (269%) of the theoretical pleat pitch. Additionally, the pleat pitch of the casing in Example 3 was 172% of the theoretical pleat pitch.

An additional test was made using the same materials and settings as described above in Example 2 with a 35.5 mm mandrel. In this example, 138 feet of casing was metered in, and the shirring head was adjusted so the shirring head did not rotate around the mandrel during shirring. Still, the diameter of the shirred stick was 54 mm, and the casing properly soaked to over 40% moisture by weight.

A similar test was conducted with a thinner casing having the same DFW as 1 M but with a pre-shirred thickness of 76 microns. This casing achieved a similar shirred diameter (53.5 mm), and soaked properly with 150 feet of casing metered into the shirred stick. Prior to the new technology this same casing manufactured by several casing suppliers could not be shirred to more than 128 feet of casing in the stick, using with the same shirred stick inner diameter, and same stick length, and meeting the soakability requirements. These examples show the surprising results of the new method. Accordingly, other casing thicknesses and inflated diameters can be used, without departing from the spirit and scope of the subject matter disclosed herein.

The pleat pitch to dry flat width ratio of 128% in Example 2 is exemplary of the implementation shown above, given the mandrel diameter is approx 83% of the casing inflated diameter. Various casings, overshirrs, and mandrel diameters can be implemented using the concepts disclosed herein to increase the ratio of the outside diameter of the shirred stick to the casing inflated diameter to values greater than 115% with a mandrel diameter which has dimensions more than 70% of the casing inflated diameter. Stated alternatively, implementations according to the method described herein result in shirred sticks with a shirred stick outside diameter at least about 5%, 10%, or 15% greater than the casing inflated diameter, shirred with an inside stick diameter at least 70% of the casing inflated diameter. The table of results above additionally shows that in the shirred stick the number of pleats is significantly reduced in the implementation described in Example 2 over the prior art, and more significantly, the pack efficiency is greatly increased. Accordingly, the number of pleats, viewed in a cross-sectional view of the casing is equal to less than 50% of the pleats formed in the casing according to the conventional method. Because there are fewer pleats, with longer pleats resulting, there are also fewer nuisance pleats, and a greater outside diameter is created, resulting in an increase in the volume available to pack casing. The increased volume to pack casing compared to the number of feet metered in allows greater volume for water absorption during soaking.

Also, in Example 1 the pleat pitch of the conventionally shirred casing included a pleat pitch of 34 mm, which was 106% of theoretical as calculated using the formula (3) above, showing close compliance to the formula. It should thus be understood that as the pleat pitch increases, the number of pleats decreases for any given casing and mandrel combination, since a longer frequency in the pleat spiral reduces the number of actual pleats for a given length of deshirred casing that is metered into the stick. Accordingly, because of the propensity of pinholes to occur in the casing at the pleats, since each fold or crease is a likely site of damage, the casing shirred in Example 2 has a greater likelihood of reliability than casings manufactured according to the prior art because it has less than half of the number of pleats of a casing shirred to the theoretical pleat pitch.

A number of embodiments of the invention have been described. Nevertheless, it will be understood that various modifications may be made without departing from the spirit and scope of the invention. For example, the above examples were performed with casings of equal dimensions on the same shirring machine. It should be understood that one of ordinary skill in the art could implement different values for shirring mandrel diameter, casing DFW, number of shirring teeth, number of shirring rolls included in the mandrel head, and other variations according to the concepts disclosed herein, without departing from the scope of the present invention as defined by the claims.

What is claimed is:

1. An article comprising:
    a shirred paper-reinforced cellulose food casing defining a shirred stick, the shirred stick formed from a tubular casing having an inflated diameter greater than about 43 mm, the shirred stick being substantially tubular and having a helical pleat ridge about a longitudinal axis in a deshirred state;
    a shirred stick outside diameter of at least 115% of the casing inflated diameter, wherein the outside diameter is the average diameter of the shirred stick along the longitudinal axis;
    a shirred stick inside diameter of at least 80% of the casing inflated diameter, wherein the shirred stick inside diameter is the average diameter of the inside of the shirred stick; and
    a pleat pitch, wherein the pleat pitch is defined as the distance between adjacent major pleats when the shirred stick is deshirred;
    wherein the shirred stick has a plurality of pleats which have been radially pulled out into an ovate shape with only a single axis of symmetry.

2. The article of claim 1, wherein the shirred stick inside diameter is at least 85% of the casing inflated diameter.

3. The article of claim 1, wherein the shirred stick inside diameter is at least 90% of the casing inflated diameter.

4. The article of claim 1, further comprising a pleat pitch-to-dry flat width ratio of at least about 56%, wherein the dry flat width is defined as the width of the deshirred casing measured normal to the longitudinal axis when the deshirred casing is in a flattened state.

5. The article of claim 2, further comprising a pleat pitch-to-dry flat width ratio of at least about 44%, wherein the dry flat width is defined as the width of the deshirred casing measured normal to the longitudinal axis when the deshirred casing is in a flattened state.

6. The article of claim 3, further comprising a pleat pitch-to-dry flat width ratio of at least about 31%, wherein the dry flat width is defined as the width of the deshirred casing measured normal to the longitudinal axis when the deshirred casing is in a flattened state.

7. The article of claim 1, wherein the pleat pitch is at least 120% of a theoretical pleat pitch, wherein the theoretical pleat pitch is defined as $$PP = 2 \times D_M ((D_I/D_M)^2 - \cos^2 \theta_c)^{1/2} - \sin \theta_c) \times 1.3,$$
wherein:

PP is the pleat pitch;
$D_M$ is the inside diameter of the shirred stick
$D_I$ is the inflated casing diameter;
$\theta_c$ is the pleat cone angle.

8. The article of claim 7, wherein the pleat pitch is at least 150% of the theoretical pleat pitch.

9. An article comprising:
a shirred paper-reinforced cellulose food casing defining a shirred stick, the shirred stick formed from a tubular casing having an inflated diameter greater than about 30 mm, the shirred stick being substantially tubular and having a helical pleat ridge about a longitudinal axis of the casing in a deshirred state;
a shirred stick outside diameter being at least 120% of the casing inflated diameter, wherein the outside diameter is the average diameter of the outside of the shirred stick along the longitudinal axis;
a shirred stick inside diameter being at least 70% of the casing inflated diameter, wherein the inside diameter is the average diameter of the inside of the shirred stick; and
a pleat pitch, wherein the pleat pitch is defined as the distance between adjacent apexes of major pleats when the casing in the shirred stick is deshirred;
wherein the shirred stick has a plurality of pleats which have been radially pulled out into an ovate shape with only a single axis of symmetry, said pleats defining a pleat cone angle; and
wherein the pleat pitch is at least 120% of a theoretical pleat pitch, wherein the theoretical pleat pitch is defined as $$PP = 2 \times D_M ((D_I/D_M)^2 - \cos^2 \theta_c)^{1/2} - \sin \theta_c) \times 1.3,$$
wherein:

PP is the pleat pitch;
$D_M$ is the inside diameter of the shirred stick
$D_I$ is the inflated diameter;
$\theta_c$ is the pleat cone angle.

10. The article of claim 9, wherein the shirred stick outside diameter is at least 125% of the casing inflated diameter and the inflated diameter is greater than about 43 mm.

11. The article of claim 9, wherein the shirred stick outside diameter is at least about 130% of the casing inflated diameter.

12. The article of claim 10, wherein the inside diameter of the shirred stick is at least 75% of the casing inflated diameter.

13. The article of claim 9, wherein the inside diameter of the shirred stick is at least 80% of the casing inflated diameter.

14. The article of claim 9, further comprising a pleat pitch-to-dry flat width ratio of at least about 80%, wherein the dry flat width is defined as the width of the deshirred casing measured normal to the longitudinal axis when the deshirred casing is in a flattened state.

15. The article of claim 9, further comprising a pleat pitch-to-dry flat width ratio of at least about 67%, wherein the dry flat width is defined as the width of the deshirred casing measured normal to the longitudinal axis when the deshirred casing is in a flattened state, and wherein the inside diameter of the shirred stick is at least 75% of the casing inflated diameter.

16. The article of claim 9, further comprising a pleat pitch-to-dry flat width ratio of at least about 56%, wherein the dry flat width is defined as the width of the deshirred casing measured normal to the longitudinal axis when the deshirred casing is in a flattened state, and wherein the inside diameter of the shirred stick is at least 80% of the casing inflated diameter.

17. The article of claim 9, wherein the pleat pitch is greater than 200% of the theoretical pleat pitch.

18. The article of claim 9, wherein the pleat pitch is greater than 250% of the theoretical pleat pitch.

19. The article of claim 9, wherein the casing is shirred on a mandrel, the mandrel having an average diameter at least 75% of the casing inflated diameter.

20. The article of claim 9, produced from the following process:
introducing the tubular casing in a flattened state via one or more feedrolls operable to propel the casing toward the mandrel, wherein the one or more feedrolls imparts a feedroll velocity to the casing;
inflating the casing into a tubular state around the mandrel, wherein the mandrel has a longitudinal axis corresponding to the longitudinal axis of the inflated casing; and
shirring the casing with a shirring head disposed circumferentially about the mandrel, the shirring head including a plurality of shirring rolls having a plurality of shirring teeth, each shirring tooth having a tooth root defined as the portion of the tooth proximate to the mandrel, wherein each of the shirring rolls rotate on a shirring roll axis normal to the longitudinal axis of the mandrel at a shirring roll velocity, wherein the shirring roll velocity is the linear velocity of the shirring tooth root when the shirring tooth is proximate to the mandrel, and wherein the casing is shirred by an overshirr of less than 150%, the overshirr calculated as a ratio of feedroll velocity to shirring roll tooth root velocity.

21. The article of claim 9, produced from the process of claim 13, wherein the overshirr is less than 105%.

22. The article of claim 9, produced from the process of claim 14, wherein the feedroll velocity is at least equal to the shirring roll tooth velocity.

23. The article of claim 9, produced from the process of claim 15, wherein the pleat pitch is determined by the circular distance between each of the plurality of teeth on the shirring roll divided by the overshirr.

* * * * *

UNITED STATES PATENT AND TRADEMARK OFFICE
CERTIFICATE OF CORRECTION

PATENT NO. : 7,507,150 B2 Page 1 of 1
APPLICATION NO. : 10/924086
DATED : March 24, 2009
INVENTOR(S) : Alan David Stall et al.

It is certified that error appears in the above-identified patent and that said Letters Patent is hereby corrected as shown below:

Title Page, Item (56), Page 2, References Cited, Column 2: Delete "6,808,771" and Insert -- 6,608,771 -- therefor Column 3, line 57: Delete "i.e.:" and Insert -- i.e., -- therefor Column 6, line 33: Delete "Kuko's" and Insert -- Küko's -- therefor Column 12, line 22: Delete "Des"

Column 13, line 6: Delete "verses" and Insert -- versus -- therefor

Column 13, line 9: Delete "cm3" and Insert -- $cm^3$ -- therefor

Column 15, Claim 9, line 43: Insert -- casing -- between "inflated" and "diameter"

Column 16, Claim 21, line 48: Delete "claim 13" and Insert -- claim 20 -- therefor Column 16, Claim 22, line 50: Delete "claim 14" and Insert -- claim 21 -- therefor Column 16, Claim 23, line 53: Delete "claim 15" and Insert -- claim 22 -- therefor Signed and Sealed this Ninth Day of June, 2009

JOHN DOLL
*Acting Director of the United States Patent and Trademark Office*